Patented Mar. 12, 1946

2,396,468

UNITED STATES PATENT OFFICE 2,396,468

GERMICIDAL PREPARATIONS

Elbert C. Ladd, Passaic, N. J., assignor to United States Rubber Company, New York, N. Y., a corporation of New Jersey No Drawing. Application December 28, 1943, Serial No. 515,971

9 Claims. (Cl. 167—32)

This invention relates to improvements in germicidal preparations, more particularly to materials for destroying or checking the growth or multiplication of fungi and bacteria. It also relates to plant growth regulator compositions. The invention further relates to methods of protecting organic material subject to attack by these microorganisms, as in the immunizing of seed, and the mildew-proofing of fabrics and other materials.

I have found that 2,2,3,4,4-pentachloro-3,4-dihydronaphthalenone-1(2) is an effective fungicide and bactericide. The structure of this compound may be represented as follows:

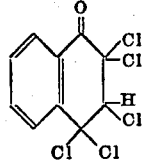

Another name for this compound is 2,2,3,4,4-pentachloro - 1 - keto - 1,2,3,4 - tetrahydronaphthalene. It may be prepared in a number of known ways. For example, the compound and a method of preparation are described by Zincke in Berichte, vol. 21, page 1044, (1888).

The 2,2,3,4,4 - pentachloro - 3,4 - dihydronaphthalenone-1(2) may be used as a seed protectant and to protect plants or soil from organisms harmful to seeds and plants. It may also be applied to prevent or retard fungus growth and the formation of, for example, mildew, on rope, wood, fur, hair, feathers, cotton, wool, leather, and the like. The 2,2,3,4,4-pentachloro-3,4-dihydronaphthalenone-1(2) may be applied as dust, or sprays, or in solution in a suitable solvent, or suspended in a suitable nonsolvent medium, for example, water. It may be applied undiluted or diluted, or mixed with carriers, fungicides, bactericides, insecticides, insect repellents, fertilizers, hormones, buffering or safening agents. It may be applied to the plant as a plant growth regulator. The term "plant" is used to include young trees, shrubs, herbs, intact plants, transplants, slips, cuttings, tubers, stems, foliage, fruit, flowers, buds and seeds. It may be applied in the manners above described to seeds to stimulate germination, or root or plumule development. It may be applied to growing plants to improve general plant growth or to increase the yield of tubers, fruit, or vegetable seed. It may be applied to cuttings to stimulate root development and to induce new root formation on cuttings normally difficult to root.

The following examples are given to illustrate the invention:

Example 1

Pea seed, variety Perfection, were tumbled with various amounts of 2,2,3,4,4-pentachloro-3,4-dihydro-naphthalenone-1(2) in dust form, as shown in the table below. The seeds were then planted in soil known to be infested with a number of organisms, including *Pythium ultimum*. The effectiveness of the fungicide was determined by comparing the number of treated seeds which germinated and developed into healthy plants with those which were untreated. The results were as follows:

| Per cent 2,2,3,4,4-pentachloro-3,4-dihydronaphthalenone-1(2) based on seed weight | Percentage seed germination after 10 days | |
|---|---|---|
| | Treated | Untreated |
| 1 | 84 | 12 |
| 0.5 | 85 | 7 |
| 0.25 | 70 | 5 |
| 0.125 | 75 | 8 |
| 0.062 | 40 | 10 |

The seed and seedlings which were untreated were observed to be infected with *Pythium ultimum* which had caused seed and seedling rot, whereas those which were treated with 2,2,3,4,4-pentachloro - 3,4 - dihydronaphthalenone-1(2) were free from this disease.

2,2,3,4,4 - pentachloro - 3,4 - dihydronaphthalenone-1(2) has also been found effective on seed corn.

Example 2

In this case, a piece of cotton fabric was dipped in 0.5% solution of 2,2,3,4,4-pentachloro-3,4-dihydronaphthalenone-1(2) in benzene and then allowed to dry. The sample was then divided into two sections. One section was inoculated with *Chaetomium globosum* spore suspension and incubated on agar medium immediately after treatment and drying; the other was inoculated and incubated on agar in a similar manner after soaking for 16 hours in water and being dried. The sections were incubated for 30 days. No growth appeared in either section. In control cotton fabrics which were not treated, and which were treated only with the solvents, and then inoculated and incubated with the same fungus under the same conditions, a heavy growth of the fungus showed within 5 days.

Example 3

This case illustrates the effectiveness of 2,2,3,4,4-pentachloro-3,4-dihydronaphthalenone-1(2) as a bactericide.

5% by weight of 2,2,3,4,4-pentachloro-3,4-dihydronaphthalenone-1(2) was suspended in water which contained 2% of Emulphor EL (believed to be reaction product of fatty acid or fatty acid ester with ethylene oxide) as a dispersing agent. A section of potato was immersed in this suspension and allowed to stand at room temperature. No growth of any naturally occurring bacteria was observed after 30 days. On the other hand, a section of potato treated in a similar way with a 2% solution of Emulphor EL in water, which solution did not contain any germicide, became heavily overgrown with naturally occurring bacteria within the same period of time.

Examples 4 and 5 illustrate the use of 2,2,3,4,4-pentachloro-3,4-dihydronaphthaelnone-1(2) as a plant growth regulator.

Example 4

Geranium cuttings of the variety Ricard were slipped in the evening. The following morning 10 cuttings each were placed in various beakers containing distilled water (control) and water to which was added 10, 31 and 100 parts per million respectively of 2,2,3,4,4-pentachloro-3,4-dihydronaphthalenone-1(2). The cuttings were allowed to remain in these aqueous media for a period of 4 hours, after which they were placed in clean sand to root. After three weeks, the cuttings were lifted and observations made on the rootings, each cutting being scored as not rooted, light rooted, medium rooted, or heavy rooted. The results are shown in the following table:

| Parts of 2,2,3,4,4-pentachloro-3,4-dihydronaphthalenone-1(2) per million parts of water | Number of plant | | | |
| --- | --- | --- | --- | --- |
| | Not rooted | Light rooted | Medium rooted | Heavy rooted |
| 100 | 0 | 3 | 1 | 6 |
| 31 | 0 | 1 | 2 | 7 |
| 10 | 1 | 2 | 1 | 6 |
| None (control) | 5 | 3 | 2 | 0 |

The above shows the effectiveness of 2,2,3,4,4-pentachloro-3,4-dihydronaphthalenone-1(2) as a rooting agent.

Example 5

A coleus plant about three weeks old was sprayed with a .5% aqueous suspension of 2,2,3,-4,4-pentachloro-3,4-dihydronaphthalenone - 1(2) containing a small amount of commercial dispersing agent. The plant was then placed in a dark humid cabinet to induce leaf drop. An unsprayed plant was placed in the cabinet at the same time as a check or control. Both plants were given a normal amount of water. After 7 days observations on the plants were made. It was found that of the 34 leaves originally on the unsprayed plant, 14 leaves had dropped, giving a 41% leaf drop. Examination of the sprayed plant showed that of the 24 leaves originally on the plant only 3 had dropped, giving a 12.5% leaf drop. The appearance of the leaves of the unsprayed plant was chlorotic, whereas the leaves of the sprayed plant retained their normal green color.

The above shows that treatment with 2,2,3,4,4-pentachloro-3,4-dihydronaphthalenone - 1(2) reduced leaf drop and maintained the plant in a healthy condition as compared to the untreated plant.

This is a continuation-in-part of my co-pending application Serial No. 473,751, filed January 27, 1943.

Having thus described my invention, what I claim and desire to protect by Letters Patent is:

1. The method of protecting organic material subject to attack by microorganisms which comprises treating the said material with 2,2,3,4,4-pentachloro-3,4-dihydronaphthalenone-1(2).

2. The method of controlling mildew on organic material which comprises treating said material with 2,2,3,4,4 - pentachloro -3,4- dihydronaphthalenone-1(2).

3. The method which comprises treating plants with 2,2,3,4,4 - pentachloro -3,4- dihydronaphthalenone-1(2) for one of the following purposes: altering the growth characteristics of said plants and protecting said plants against attack by fungi.

4. The method of immunizing seeds which comprises treating said seeds with 2,2,3,4,4-pentachloro-3,4-dihydronaphthalenone-1(2).

5. A method of stimulating plant growth which comprises treating plants with 2,2,3,4,4-pentachloro-3,4-dihydronaphthalenone-1(2).

6. In the propagation of plants, the method altering the growth characteristics of the plant which comprises treating the plant with 2,2,3,4,4-pentachloro-3,4-dihydronaphthalenone-1(2).

7. The improvement in propagating plants from cuttings which comprises subjecting the cuttings to the action of 2,2,3,4,4-pentachloro-3,4-dihydronaphthalenone-1(2).

8. A fungicidal, bactericidal and plant growth stimulant composition comprising an aqueous suspension of 2,2,3,4,4-pentachloro-3,4-dihydronaphthalenone - 1(2), said aqueous suspension containing a dispersing agent.

9. A fungicidal composition comprising an aqueous suspension of 2,2,3,4,4-pentachloro-3,4-dihydronaphthalenone-1(2), said aqueous suspension containing a dispersing agent.

ELBERT C. LADD.